United States Patent [19]

Alary et al.

[11] Patent Number: 5,211,822
[45] Date of Patent: May 18, 1993

[54] PROCESS FOR THE PRODUCTION OF A SEMIPERMEABLE MEMBRANE ON A POROUS CONDUCTIVE SUPPORT BY ELECTROPHORESIS

[75] Inventors: Jean-André Alary, St Etienne de Crossey; Francis Gugliermotte, Voreppe; Jean-Pierre Isnard, Grenoble, all of France

[73] Assignee: Pechiney Recherche, Paris, France

[21] Appl. No.: 493,370

[22] Filed: Mar. 14, 1990

[30] Foreign Application Priority Data

Mar. 14, 1989 [FR] France ............................ 8904197
Dec. 6, 1989 [FR] France ............................ 8916738

[51] Int. Cl.⁵ ........................................ C05B 7/00
[52] U.S. Cl. ............................ 204/180.7; 204/180.2; 204/181.4; 204/181.5; 204/181.6; 204/181.7
[58] Field of Search .............. 204/180.7, 180.2, 181.4, 204/181.5, 181.6, 181.7

[56] References Cited

U.S. PATENT DOCUMENTS 1,822,240  9/1931  Schade ..................... 204/180.7 X

FOREIGN PATENT DOCUMENTS

1418131  10/1965  France.
60-54983A  3/1985  Japan.
5691  of 1910  United Kingdom ............. 204/181.5

Primary Examiner—John Niebling
Assistant Examiner—Arun S. Phasge
Attorney, Agent, or Firm—Dennison, Meserole, Pollack & Scheiner

[57] ABSTRACT

The invention relates to a process for the production of a semipermeable membrane on a porous conductive support. The process involves the stages of finely dispersing in an aqueous or hydroorganic medium, insoluble solid mineral products in the presence of an electrodepositable coating resin, the preparation of an electrophoresis bath by adjusting the composition of the dispersion, deposition by electrophoresis of a layer of resin-coated, solid mineral products on a porous conductive support, possible deposition of several coatings and heat treatment of the porous conductive support and its layer of electrodeposited solid products. This gives filtering membranes suitable for microfiltration, ultrafiltration and reverse osmosis.

25 Claims, 10 Drawing Sheets

PROCESS FOR THE PRODUCTION OF A SEMIPERMEABLE MEMBRANE ON A POROUS CONDUCTIVE SUPPORT BY ELECTROPHORESIS

The invention relates to a process for the production of an ultrafiltration, microfiltration or reverse osmosis element constituted by a semipermeable mineral membrane on a porous conductive support.

Various processes are known for producing elements to be used in microfiltration, ultrafiltration or reverse osmosis.

A first group of processes involves depositing on a porous support a particle dispersion with an adapted particle size. Thus, in French Patent 2 228 518 by grinding or milling in an aqueous medium a powder dispersion of a metal oxide, such as zirconia is prepared and from it are separated by filtration the finest particles, so as to only retain the agglomerated particles. The latter are then returned to aqueous suspension and circulated in porous tubes acting as a support. The particles are separated by filtration and cover the substrate pore openings with a fine filtering layer.

In European Patent 154 295, a well deflocculated, concentrated slip of a ceramic material powder is prepared and in it is immersed each of the ends of a macroporous block having longitudinal channels, so as to at least partly fill the pores of said macroporous block, whilst carrying out ultrasonic stirring of the slip, followed by fritting or sintering. A membrane is then deposited on the surface of the channels by slip painting, by introducing the slip into the channels, emptying the latter, drying the thus deposited layer and finally sintering it at 1600° C.

A second group of processes involves depositing a metal hydroxide-base peptized gel on a porous support. In French Patent 2 555 067 a mixture is formed from an organometallic compound, such as a metal oxide and a thickening agent in an anhydrous organic solvent medium. By slip painting a thin film of the mixture is deposited on a porous support, the deposited film is dried in a sufficiently moist atmosphere to permit the hydrolysis of the metal oxide and then the thickening agent is eliminated by a heat treatment, followed by sintering of the particles at between 800° and 1000° C. In a variant of this process, a mixture is deposited by slip painting on the porous support and which contains, apart from a thickening agent, a mineral acid and the metal hydroxide produced as a result of hydrolysing the metal alkoxide. In both variants use is made of the slip painting process. It consists of filling with the mixture a porous tube, whose pores are larger than those required in the ultrafiltration element, which is then left for a few minutes, followed by the emptying of the tube. Part of the mixture remains deposited on the inner surface of the tube, which is then dried and undergoes a heat treatment.

In French Patent 2 550 953 a thin film of a peptized hydroxide gel is deposited by slip painting on a permeable porous substrate, which is then dried and heat treated at between 500° and 1100° C. According to an advantageous embodiment of the process, it is then possible to carry out the deposition of a second peptized gel film, which makes it possible to fill any deficiencies due to lack of wetting during the first deposition operation. This also makes it possible to fill any cracks, formed during the heat treatment of the first deposit.

All these processes involve a phase of depositing either solid mineral particles, generally in slip form, or peptized gels of metal hydroxides. The most widely used deposition procedure is slip painting. The latter suffers from the following well known disadvantages:

Slip painting can only be easily used in the interior of hollow bodies, which can be filled and emptied, typically porous tubes.

The rheological time stability of compositions suitable for slip painting and in particular slips, is poor, so that it is difficult to ensure a deposit of constant quality.

Slip painting is based on a number of complex phenomena which, apart from the rheological properties of the compositions to be deposited, include wetting, surface tension, capillarity and gravity phenomena, without taking account of any possible hydrodynamic effects linked with the filling and emptying of the porous container, so that it is not possible to ensure locally filtering coatings with the same characteristics.

Following the emptying of the porous container, the slip painted porous support can only be handled with care, avoiding any contact with the slip painted surface.

The deposit on the porous support has a filtering mineral content, which is essentially that of the slip or starting gel. Thus, the drying phase takes a long time generally leading to faiencing and even to cracking or crumbling of the dry membrane, so that several successive slip painting operations may be required to obtain a crack-free membrane.

Finally, the filtering layers deposited on a porous support by slip painting may not be adequately attached and may become disengaged from the porous support, particularly in the case of the declogging of the filter.

The Applicant has sought and found a process obviating all these disadvantages. The inventive process involves the following stages:

a) in a liquid medium such as water or water mixed with at least partly hydrosoluble organic solvents are finely dispersed water-insoluble, solid mineral products, which are initially finely divided in the form of peptized gel or powder, in the presence of an electrodepositable, hydrosoluble coating resin, which gives a fine dispersion.

b) an electrophoresis bath (1) is prepared by possibly adjusting the composition of the previously obtained fine dispersion by adding water and/or at least partly hydrosoluble organic solvents and/or coating resin. Thus, the optimum compositions making it possible to obtain a fine dispersion are not necessarily those corresponding to an electrophoresis bath.

c) after contacting said electrophoresis bath (1) with all or part of the porous conductive support (2) having a random geometry and used as the electrode and with a metal counterelectrode (3), by electrophoresis is deposited a layer (10) of electrodepositable resin-coated, finely divided, solid mineral products on the entire surface of the porous conductive support in contact with the electrophoresis bath.

d) it is optionally possible to electrodeposit one or successively several further solid mineral product layers, with an increasingly fine grain size and/or of different chemical nature.

e) this is followed by the heat treatment of the porous conductive support, coated with one or more layers of finely divided mineral products, so as to eliminate the water, the residual organic solvent and the organic substances, followed by the sintering of the layer of finely divided, solid mineral products until the desired pore fineness is obtained.

The first stage of the process according to the invention relates to the preparation of a fine dispersion of finely divided solid mineral products in the presence of an electrodepositable coating resin.

These finely divided solid mineral products can be finely divided powders belonging to the oxides: $ZrO_2$, $TiO_2$, $Al_2O_3$, $SiO_2$, $Y_2O_3$, $3Al_2O_3$—$2SiO_2$ (mullite), cordierite ($2Al_2O_3$—$2MgO$—$5SiO_2$), $Al_2TiO_5$ (aluminium titanate) $Al_2MgO_4$ (magnesium spinel), $ZrSiO_4$ (zircon) applicable to microfiltration, ultrafiltration, reverse osmosis and gaseous permeation, $RuO_2$ being applicable to electro-ultrafiltration and gaseous permeation. These powders can belong to other chemical groups, such as SiC, $Si_3N_4$, SiAlON, more specifically usable in microfiltration and ultrafiltration. The specific surface of the finely divided powders can range from a few to several hundred $m^2/g$.

The finely divided solid mineral products can also be peptized gels based on Al, Ti, Zr, Si, Y hydroxides or mixtures of these hydroxides, particularly aluminium hydroxide with other metals being able to lead to the formation of spinels and in more general terms based on precursors of oxides, in the form of powder and as defined hereinbefore. According to the invention, it is possible to use mixtures of solid mineral products differing by their chemical or crystallographic nature, or by their particle size, either by simultaneously dispersing the solid mineral products, or by mixing with stirring a fine dispersion of each of them.

The finely divided solid mineral products are chosen as a function of the requirements encountered during the putting into service of the filtering membrane, such as the chemical inertia, corrosion resistance, harmless in the case of contact with food products and obviously also the manufacturing requirements in connection with the porous membrane, such as a limited solubility in water and a thermal stability of the solid starting product. The finely divided solid mineral products are dispersed according to the invention in a liquid medium such as water or water mixed with organic solvents which are at least partly hydrosoluble in the presence of an electrodepositable resin.

More specifically, the liquid medium is constituted by 30 to 100% by weight of water and 0 to 70% by weight of one or more at least partly hydrosoluble organic solvents, generally hydroxylated organic solvents such as alkyl glycols, e.g. ethylene glycol and butylene glycol.

The procedures for dispersing solid products in a liquid medium unsable according to the invention are known and utilize e.g. ball, rod and sand mills, twin-screw mixers, ball or sand fast dispersers, ultrafast dispersers with rotors and stators, as well as mechanical vibration or ultrasonic dispersers.

In the dispersion phase, there is simultaneously a deagglomeration of the starting solid mineral product, which can possibly be in the form of fine, but agglomerated particles, as well as a coating of the deagglomerated solid mineral product by an electrodepositable hydrosoluble resin, so as to have a fine dispersion, which is stable in time, which is entirely electrodepositable and has an average grain size between 1 nm and 10 μm.

According to the invention, it is possible to use hydrosoluble resins which are cathode depositable (cataphoresis bath) or anode depositable (anaphoresis bath).

A cathode-depositable resin is preferably chosen, because this group at present provides the largest choice of resins and these resins have a better electrical efficiency. Such resins are e.g. marketed under the trademark RESIDROL (Residrol SWE 5219 and SWE 5186) by Hoechst. Finally, the formulation can contain additives for facilitating the dispersion phase, such as antifoaming agents.

The dispersion stage is controlled by grain size analysis and is continued until the desired fineness is obtained. If appropriate, the fine dispersion is separated from the grinding or milling members (balls, rods, sand, etc.).

According to the invention, the composition of the fine dispersion is optionally adjusted by adding, accompanied by stirring, a solution based on water, hydroorganic solvent and electrodepositable resin, so as to have an electrophoresis bath satisfying the following conditions. If M is the weight percentage of the mineral material and O the weight percentage of the organic material (based on the dry extract of the electrodepositable resin), the electrophoresis bath must have the following characteristics:

a) M+O between 5 and 45% and preferably between 15 and 30%, b) M/O ratio between 0.1 and 25 and preferably between 0.5 and 10 and c) resistivity $\rho$ between 100 and 5000 $\Omega$.cm and preferably between 500 and 2000 $\Omega$.cm.

This gives dispersions of time-stable fine particles.

According to the invention, in the electrophoresis bath is placed a conductive porous support with a random geometry, whereof part can be kept out of contact with the bath by any appropriate means, e.g. by the application of a plastic film, or by depositing paint or varnish on the surface to be removed and whereof the other part is to be coated with a filtering membrane. Typically, the porous conductive support can have pores between 0.1 and 50 μm and can be based on a metal, metal alloy, conductive ceramic or carbon-containing materials, including carbon-carbon composites, which are preferably graphitized. The porous conductive support can be rigid and have a random shape, the most widely used shapes being tubes and plates, but for certain semi-rigid or even flexible applications, it can e.g. be of the conductive fabric, sheet or netting type with metal conductive fibres, or of graphite or any other appropriate conductive material. After placing a metal counterelectrode in the electrophoresis bath and which is connected, in the same way as the porous conductive support, to a direct current generator, whose polarity is fixed as a function of whether the resin is to be cathode or anode deposited, electrodeposition takes place of a layer of solid mineral products, which are coated with a resin and then electrocoagulated.

The Applicant has found that when the porous conductive support was a tube which was long compared with its diameter, i.e. typically having a length exceeding by four times the internal diameter of the tube, it was not possible to obtain a deposit of regular thickness on the inner surface of the tube. In this case, the invention is performed with the aid of a conductive counterelectrode (3) centered within the tube (2), whereby the composition of the electrophoresis bath (1) can be kept constant within the tube by any appropriate means, typically by ensuring a circulation of the bath.

There are numerous performance variants for the invention in the case where the porous support is a tube which is much longer than its diameter and these vary in particular as a function of the counterelectrode type and whether or not there is a relative displacement of the counterelectrode (3) and the tube (2).

According to a first variant of the invention, the counterelectrode is a conductive wire (3) substantially having the length of the tube (2). In accordance with FIG. 4, the invention can be performed in a completely static manner, but it is preferable for the bath to be stirred, so as to avoid any sedimentation risk. So that there is no deposition of bath (1) on the outer surface of the tube, it is possible to cover the outer surface of the porous tube with a product which is either insoluble or slightly soluble in the electrophoresis bath, such as an optionally thermoretractable plastic film, a varnish or a wax; whereby all of these will be eliminated following the deposition of the semipermeable membrane.

Figure 5:
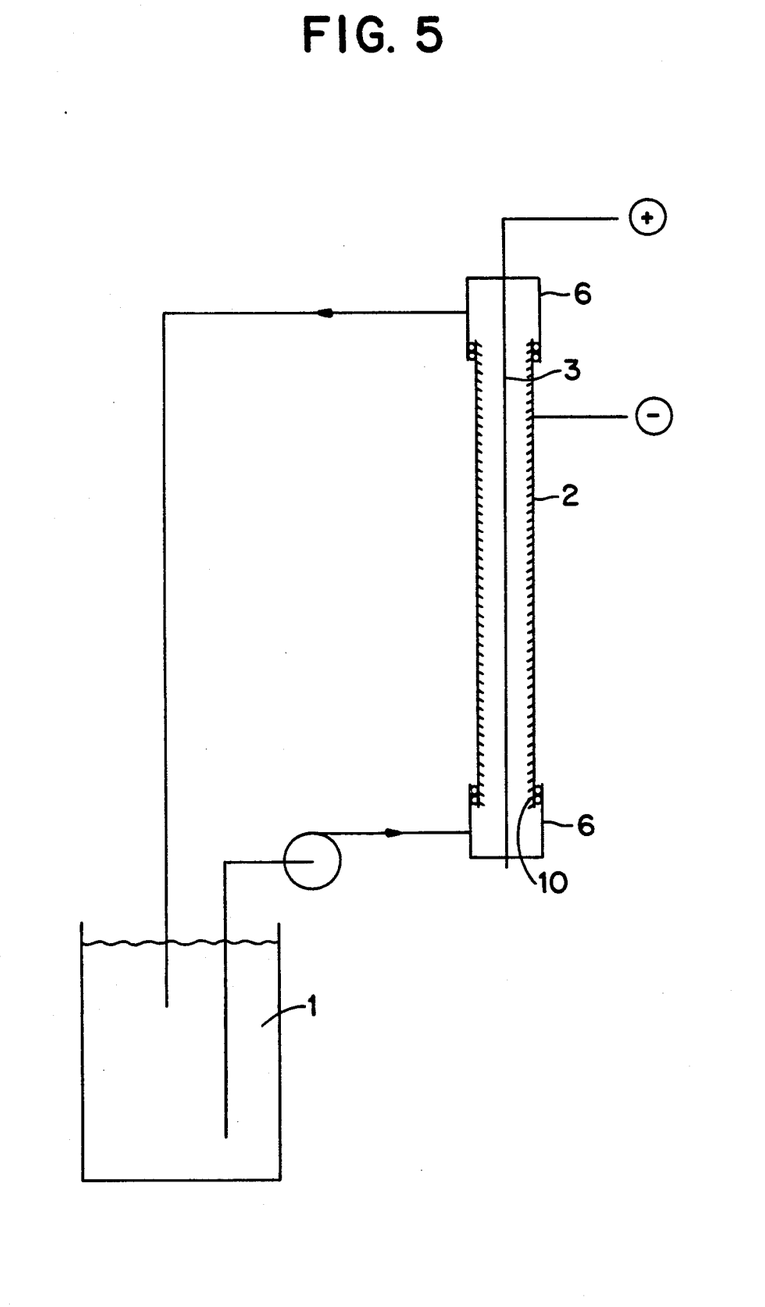
FIG. 5 shows a porous tube (2) in which circulates, by means of a pump, an electrophoresis bath (1), the tube ends being sealed by insulating material centering end fittings (6).
Figure 6:
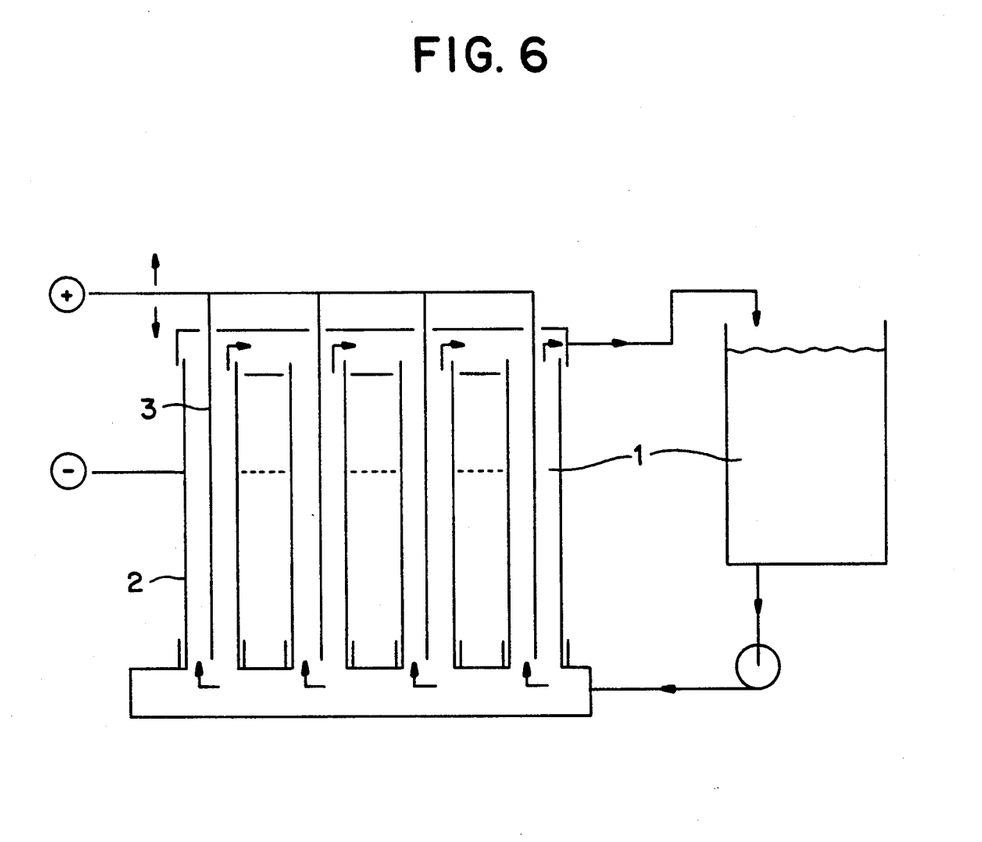
FIG. 6 shows a group of porous, parallel tubes (2), positioned vertically on a bath supply tank (1), connected to a bath reservoir and with a group of counterelectrodes (3) centered within the tubes.

The bath (1) can be circulated, typically with the aid of a pump, within the tube (2) and as illustrated in FIGS. 5 and 6. FIG. 6 illustrates another variant in which bath (1) is electrodeposited in a plurality of parallel tubes (2) traversed by a plurality of conducting rods (3) as the counterelectrode, the bath being stirred by a circulating pump.

In these variants, it is possible to centre the counterelectrode with the aid of insulating centering endpieces (6), which can also seal the tube ends.

Figure 7:
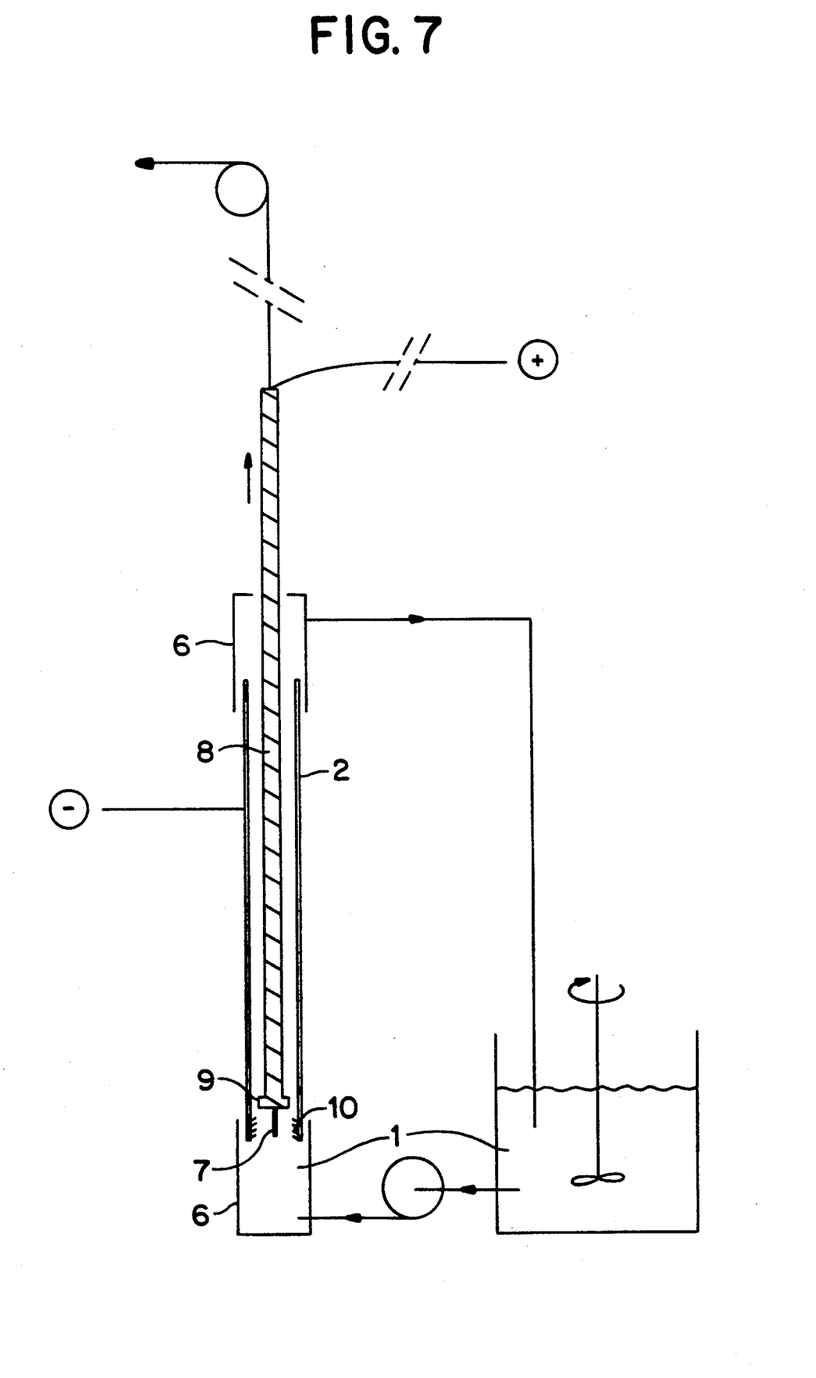
FIG. 7 shows a porous tube (2) within which circulates an electrophoresis bath (1) and a mobile counterelectrode constituted by a conductive part (7) serving as the anode, a part (8) in which the conductive element is covered by an insulating material and a centering member (9) made from insulating material; layer (10) forming progressively as the counterelectrode rises.

According to a second variant of the invention, the counterelectrode has a conductive part (7) acting as the counterelectrode and an insulated part (8), which is preferably provided with at least one insulating material centering member (9) integral with the counterelectrode and advantageously positioned at the junction of the two parts (7) and (8), so that the conductive part (7) can in no way touch the inner wall of the tube. The active part of the counterelectrode, i.e. conductive part (7) has a length smaller than that of the non-conductive part (8) and its length is typically 0.5 to 4 times the internal diameter of tube (2). During electrodeposition, the interior of the tube contains bath (1) and the active part of the counterelectrode (7) and tube (2) are subject to a relative movement, so as to progressively cover the entire internal surface of the tube with the electrodeposited layer.

Figure 71:
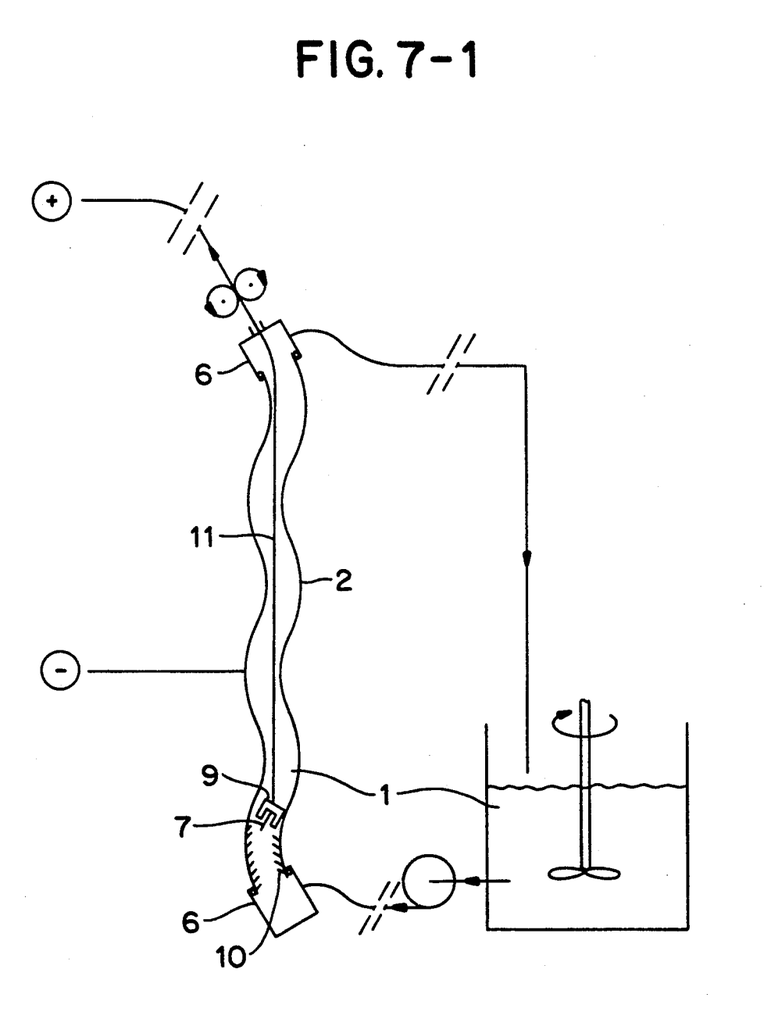

According to the process illustrated in FIG. 7, the tube (2) in which is circulated the electrophoresis bath (1) is maintained in the fixed position and the conductive part (7) is moved during the electrodeposition stage from one tube end to the other. As shown in FIG. 7-1, the counterelectrode can be constituted by an assembly incorporating a flexible electric cable (11) covered with an insulating sheath and a centering part (9), in order to support the relatively short conductive part (7). This type of counterelectrode makes it possible to displace a conductive part (7) in possibly non-rectilinear tubes by pulling on cable (11).

Figure 4:
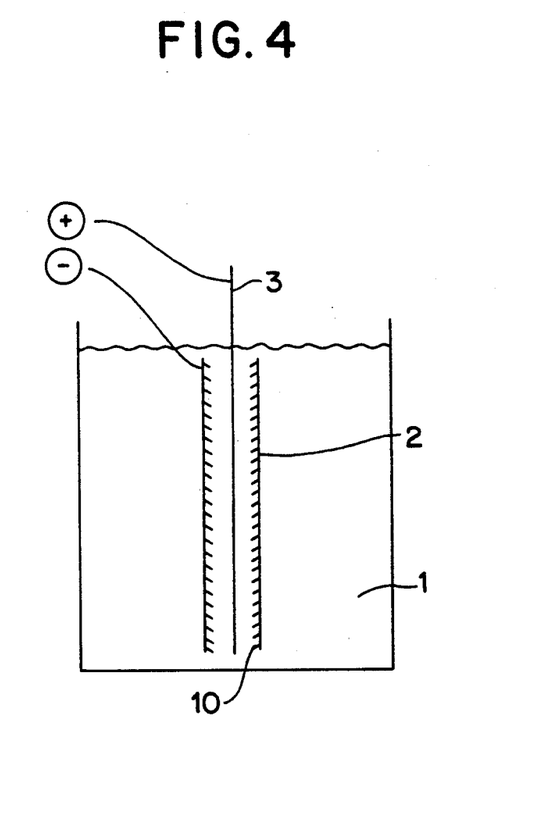
FIG. 4 shows an electrophoresis bath (1) in which is immersed a porous conductive tube (2) serving as the cathode, with a counterelectrode (3) serving as the anode, centered throughout the length of the tube interior. Layer (10) is formed by electrodeposition and, following subsequent treatment, this gives the semipermeable membrane.

One of the interests of this second variant, particularly in the case of the processes illustrated by FIGS. 4 and 4-1, is that there is virtually no risk of any damage to the layer (10) once deposited, e.g. as a result of an accidental contact, because the conductive part permitting the deposition of layer (10) leaves the latter behind it in the manner of a wake. There is also no migration or outflow of the bath through the porous tube during the electrodeposition. Thus, the porous tube wetting time always exceeds the residence time of the bath within the tube or tubes. Moreover, the electrodeposited coating is perfectly tight.

According to the invention, the relative displacement of the tube and the counterelectrode in said second variant can be automated. Advantageously the displacement speed can be made dependent on an electrophoresis electric signal, no matter whether it is voltage, current density, intensity or current quantity, so as to obtain the desired coating thickness.

According to the invention, electrodeposition takes place of resincoated, finely divided, solid mineral products, under a voltage between 50 and 500 V and preferably between 100 and 300 V with a current intensity between 5 and 50 mA/cm$^2$ and preferably between 10 and 30 mA/cm$^2$.

Figure 1:
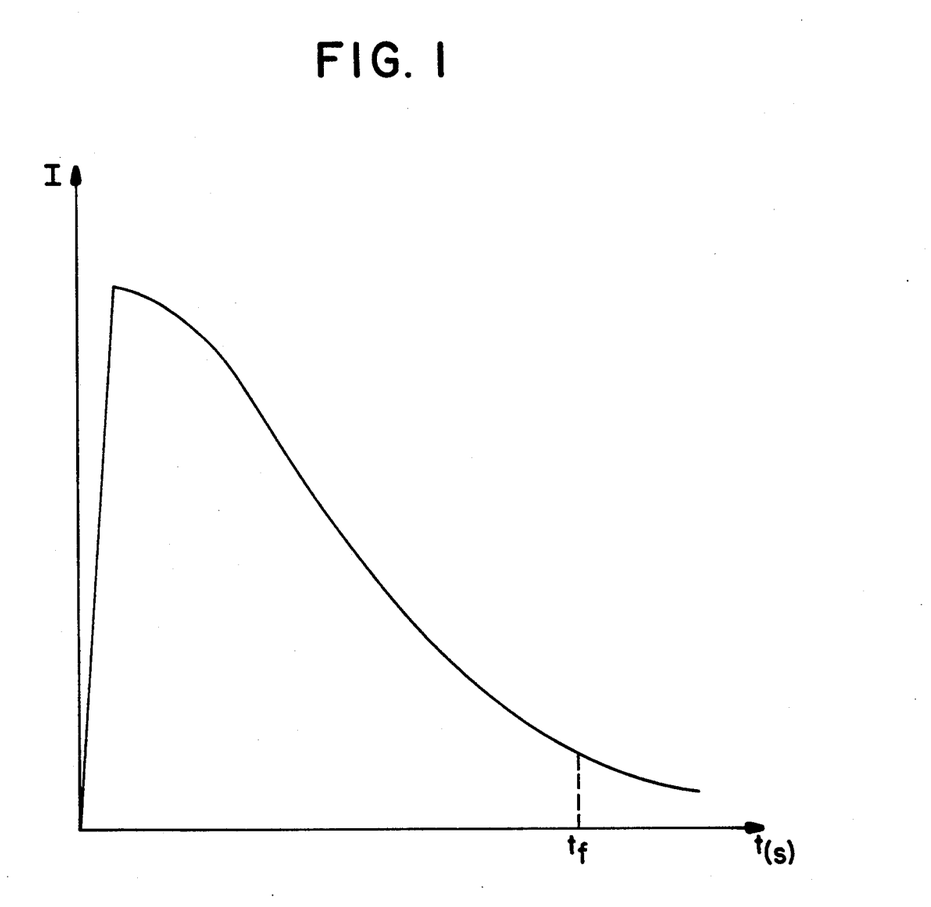
FIG. 1 illustrates an intensity curve I of the electrophoresis current on the ordinate as a function of the time t on the abscissa, expressed in seconds; tf indicating the deposition completion time, 90 seconds in the examples.

Electrodeposition can be carried out under a constant voltage or a constant current density. It is preferably carried out at a constant voltage and variable current density. In this case, the evolution of the current density or current quantity during time quantitatively expresses the deposition kinetics. The current density drops after 1 to 2 minutes, typically in accordance with the curve of FIG. 1, no matter what the geometry, representing the formation by electrodeposition of an increasingly insulating coating and in homogeneous form over the entire porous support in contact with the bath. Thus, in a manner inherent in the process, there can be no porous support part in contact with the bath, which is not covered with an insulating resin coating covering the solid particles. Thus, on the one hand the least covered parts are more conductive, i.e. the most active in electrodeposition, so that there is a permanent autoregulation leading to a homogeneous deposit over the entire surface exposed to the bath and on the other hand the bath still contains a considerable fine dispersion excess, so that electrodeposition could be continued until the insulating layer had a uniform resistivity and therefore a uniform thickness.

The layer thickness obtained is dependent both on the composition of the electrophoresis bath, particularly the M/O ratio, and the electrodeposition conditions (electrodeposition time and particularly voltage, if the latter takes place at a constant voltage).

At the end of electrodeposition, which lasts 1 to 2 minutes, the porous support is removed from the bath and rinsed with water. The deposited coating adheres to the support and has a consistency such that the manipulation of the thus treated porous support is possible without taking any special precautions, the coating having an overall dry extract (M+O) exceeding 90%.

According to the invention, electrodeposition can be carried out successively in several electrophoresis baths, when it is wished to deposit several solid mineral product coatings for the production of an asymmetrical membrane or a composite membrane. Thus, an asymmetrical membrane is obtained by successive deposits of controlled thickness of solid mineral products of the same chemical nature, but increasingly fine grain size. In the same way, a composite membrane is obtained by successive deposits of solid mineral products of a different chemical nature and which can also have an increasingly fine grain size. In the field of these "multilayer" membranes, the invention has two important advantages compared with the prior art. On the one hand deposition by electrophoresis permits a regular deposition of coatings with a limited thickness, so that small pore size and small total thickness, i.e. high flow rate, "multilayer" membranes can be obtained as a result of the invention. On the other hand, unlike in the prior art, the successive deposits are obtained without any intermediate treatment between each deposit and in particular without any heat treatment, which is an important economic and technical advantage.

According to the invention, the thus coated porous support undergoes a heat treatment, so as to eliminate the small amounts of water and organic solvents still present in the electrodeposited coating, followed by the elimination of the resins and then the controlled sintering of the fine mineral particles. Moreover, on starting with mineral solids in the form of peptized gels, in generally known manner the heat treatment leads to chemical, physical or crystallographic modifications taken into account in the initial choice of the peptized gel. If the porous support is oxidizable, the heat treatment is carried out under a neutral or reducing atmosphere, e.g. under $H_2$, Ar or $N_2$ with 10% by volume $H_2$. If the support is not oxidizable, e.g. in the case of a conductive ceramic support, an oxidizing atmosphere can be used.

Typically, the heat treatment uses two ranges, the first between 200° and 500° C., generally at about 300° C., in order to eliminate the volatile products and the second at the sintering temperature Tf of the finely divided mineral solid, which is between 500° and 2500° C. and generally between 800° and 1200° C., the duration of said ranges being a function of the volatile material content and the desired sintering level. The range temperature rises take place with a heating speed between 0.1° and 10° C./min.

The final sintering stage is one of the parameters controlling the final diameter of the pores and the porous volume of the filtering membrane. For a given finely divided, solid mineral, the Expert determines the sintering temperature at the sintering time making it possible to obtain the desired final pore diameter and porous volume. For information purposes only, the invention makes it possible to obtain mineral membranes with a thickness between 0.1 and 20 $\mu m$ with pore diameters between 0.001 and 1 $\mu m$.

Figure 2A:
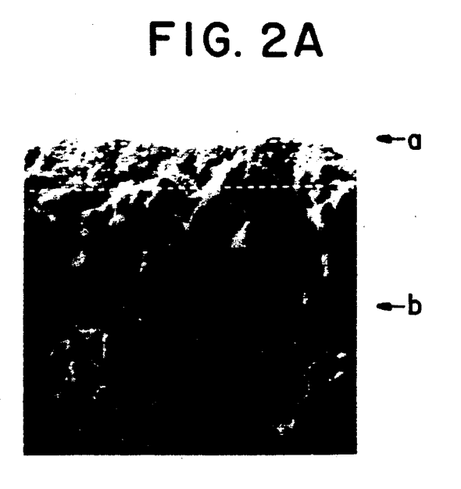
FIG. 2A is a sectional view of a filtering layer (a) according to the invention and its support (b) (diagrammatically shown in FIG. 2a for reasons of clarity).
Figure 2B:
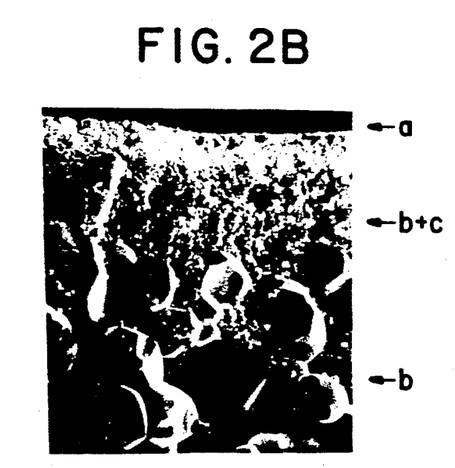
FIG. 2B is a sectional view of a prior art filtering element having a filtering layer (a) and an intermediate layer (c), which deeply penetrates support (b) (diagrammatically shown in FIG. 2b for reasons of clarity).

Microscopic section examinations (FIG. 2A) reveal the anchoring of the mineral membrane to the support. Slight penetration and imbrication of the mineral membrane in the porous support take place, so that they cannot be separated. On comparing microscopic sections of a membrane and its porous support obtained according to the invention (FIG. 2A) and using the prior art slip painting method (FIG. 2B), it can be seen that in the prior art an intermediate coating is necessary to avoid an excessive penetration of the membrane into the support.

The invention has numerous advantages, which are of different types and occur at different stages of its performance. The invention firstly makes it possible to obtain highly stable fine dispersions and in particular having a good rheological stability, which permits a great flexibility of use. It also makes it possible to deposit a filtration membrane on a porous conductive support of any random shape, in a fast, precise, uniform and reproducible manner.

Another advantage of the invention is that the deposit has a high dry extract (exceeding 90%), which has three important practical consequences. Thus, the porous supports treated according to the invention can be handled without taking any special precautions, the initial phase of drying and eliminating the water and organic solvents is eliminated and this type of deposit leads to membranes without faiencing or cracking, thus obviating scrapping or highly expensive repeat operations.

In the case of slip painting, the dry extract percentage is much lower, namely between 40 and 70%. Therefore the deposited coating is very fragile and can only be handled after a long and perfectly controlled drying period, generally lasting more than 24 hours. The inventive process also makes it possible to produce a considerable diversity of filtering membranes, particularly asymmetrical or composite, multilayer membranes, particularly through the use of successive electrophoresis baths. The process makes it possible to control the thickness and porosity of these membranes, whilst ensuring an excellent attachment to the support.

The process according to the invention is particularly economic. Firstly, the deposition of the layer of solid mineral products is very fast and secondly there is no longer any need for an initial drying phase, taking more than 24 hours in the prior art. Finally, in the case of multilayer membranes, it is not necessary, unlike in the prior art, to make the membrane undergo a heat treatment between each deposition operation.

Another important advantage of the invention is the possibility of a complete control of the complete process so that, on demand, it is possible to produce filtering membranes having clearly defined, predetermined characteristics, such as thickness, pore diameter and porous volume.

Taking account of the deposition speed, this process can in certain cases be carried out continuously and in all cases can be automated, because the advance of the deposition is revealed by an electrophoresis electric "signal", such as the current density or intensity if deposition takes place at constant voltage, or the voltage or current quantity. The preferred electric "signal" is the current density or quantity. In particular, the deposition phase can be interrupted at the end of a predetermined time, or preferably when the chosen electric "signal" has reached a predetermined desired value.

Thus, the process according to the invention makes it possible to control both the electric field, the bath composition and the deposition time, so that filtering membranes, and in particular those of the filtering tubes obtained according to the invention, have the same characteristics between individual tubes and also from one end to the other of the same tube. Thus, the obtaining of a constant quality membrane is obviously of very great interest from the practical standpoint.

Figure 91:
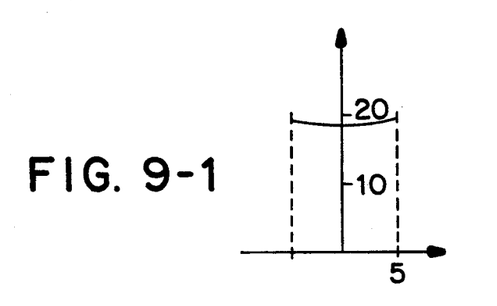
Figure 92:
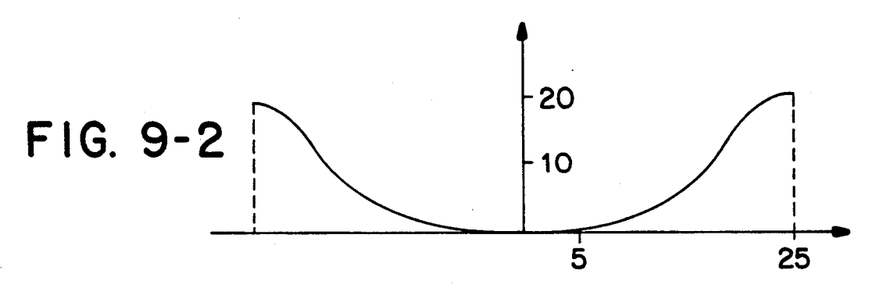
Figure 93:
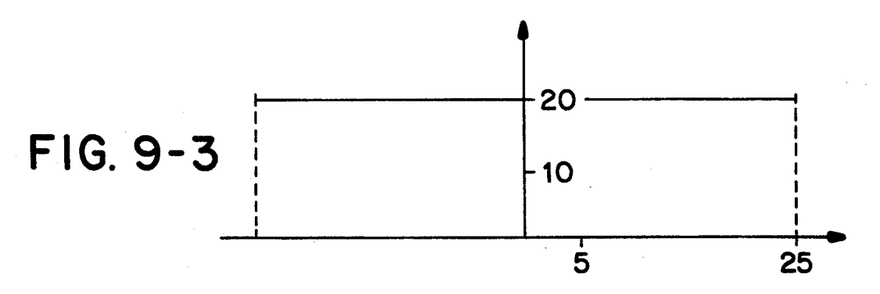

Another advantage of the invention is that it is suitable for the treatment of a large number of porous tubes simultaneously. It is easy to pass from the treatment of a single tube to the parallel treatment of a large number of tubes, as is e.g. shown in FIG. 9, so that the invention is an economic process for the production of filtering membranes.

Thus, the invention provides advantages of an economic and technical nature, relating both to the performance of the process and to the product obtained.

The semipermeable membrane deposited on a porous support according to the invention can then be used as such, or as an element of an apparatus having several elements, for various industrial applications or separating methods such as reverse osmosis, microfiltration or ultrafiltration. These can be used during the treatment of liquids, such as sterilization, water desalination or the concentration of food products, drinks, milk serum, purification of industrial liquids and oils, as well as during the treatment of vapours, fumes, gases, such as air, or in a more specific application such as isotopic separation.

EXAMPLE 1

Zirconia ultrafiltration membrane on a porous stainless support

Zirconia powder used: $ZrO_2$ UHP at 18 $m^2/g$ from CRICERAM. The following mixture:

| | |
|---|---|
| $H_2O$ | 70% |
| Résidrol SWE 5186 | 10% |
| $ZrO_2$UHP | 20% |

This mixture undergoes violent stirring of the Turrax type in order to coat the zirconia grains, whose mean diameter is 0.3 μm. Turrax stirring takes place for 10 min at 20,000 r.p.m. The bath characteristics are then:

| | |
|---|---|
| PH | 6 |
| M + O = | 30% |
| M/O = | 2 |
| ρ = | 800 Ω · cm |

After aging for 24 h under slow stirring, deposition takes place on a porous stainless plate (porosity 35%, pore diameter between 4 and 8 μm).

Figure 3:
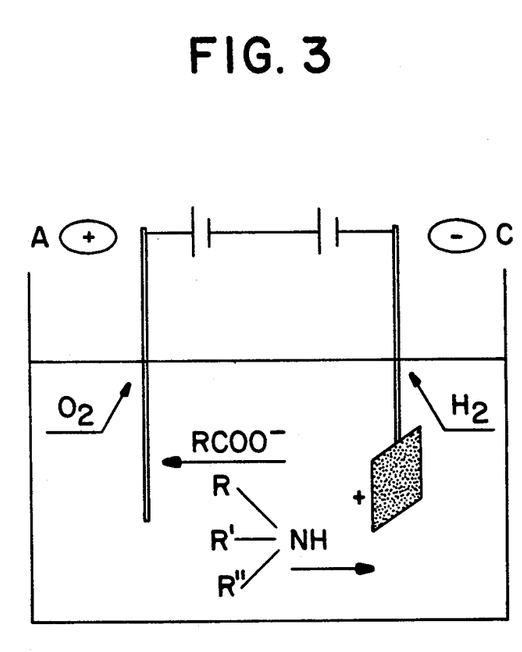
FIG. 3 a cataphoresis cell with RCOO⁻, which symbolizes the soluble anionic part of the electrodepositable resin and RR'R" NH⁺ symbolizing the cationic part, which is cathode electrodeposited.

The table gives the deposited coating thicknesses as a function of the electrical characteristics imposed on the circuit terminals, in accordance with the circuit diagram of FIG. 3.

| V Volt | I mA/$cm^2$ | deposited thickness | Current passage time |
|---|---|---|---|
| 100 | 12.5 | 20 μm | 90 s |
| 200 | 12.5 | 40 μm | 90 s |

The thus deposited coating can easily be handled and can directly undergo the final heat treatment stage. The latter is broken down into several temperature rise gradients in order to take account of the organic materials used and also the productivity level, which should be as high as possible. Without imposing any limitation, a heat treatment program can be described in the following way:

Atmosphere: Ar/$H_2$ mixture, 10% by volume $H_2$
Flow rate: replenishment of the furnace volume 15 times per hour.
Rise program:
1° C./min from 25° C. to 300° C.
range 1 h to 300° C.
0.5° C./min from 300° C. to 900° C.
0.3° C./min from 900° C. to Tf
950° C.<Tf<1100° C.
range 1 h to Tf
cooling by 0.5° C./min to 800° C. and then natural cooling of the bath.

This heat treatment leads to a homogeneous zirconia layer, whose thickness is dependent on the initial M content of the bath used and the thickness of the layer deposited by cataphoresis. In the present case, it is 4 μm for the deposit performed at 100 V and 8 μm for that at 200 V. When measured with the mercury porosimeter, the diameter of the pores of the zirconia layer is approximately 0.025 μm for a heat treatment at Tf=1050° C.

EXAMPLE 2

Zirconia ultrafiltration membrane on porous stainless support

The zirconia powder used in this case has a finer grain size: powder $ZrO_2$ UHP 40 $m^2/g$ from Criceram. According to another cataphoresis bath preparation procedure, the mixture is prepared in the following way:

| Solution A: | |
|---|---|
| $H_2O$ | 34.5% |
| Résidrol SWE 5186 | 15.0% |
| $ZrO_2$UHP 40 $m^2/g$ | 35.0% |
| Butylene glycol | 15.5% |

Solution A is mixed in the "Turbulat" mixer for 24 h with the aid of diameter 1 mm, zirconia grinding balls. The filling volume of the grinding container is 36% and the ratio of the grinding means charge to the zirconia powder is 29%.

A solution B is prepared by adding:

| Solution B | |
|---|---|
| $H_2O$ | 56.6% |
| Résidrol SWE 5186 | 36.0% |
| Ethylene glycol | 5.0% |
| Ethyl-2-hexanol | 2.4% |

Solution B added to solution A and a certain quantity of water makes it possible to perfectly adjust the parameters M+O and M/O to the desired values.

Function of the solvents

Ethyl-2-hexanol is an antifoaming agent making it possible to eliminate residual air bubbles, which are harmful to the surface homogeneity of the deposit.

Ethylene and butylene glycol differ according to their affinity for water (hydrophily) or for the organic medium (lipophily), but also as a result of their polarity. As a function of their affinity, they are distributed between the aqueous phase and the organic phase (resin) of the emulsion.

Ethylene glycol is the most polar of the two solvents. It is highly soluble in water and its distribution is very favourable for this phase (approx. 80%). The less polar butylene glycol is only partly soluble in water and its distribution is 50% in water and 50% in the organic phase (resin).

As a result of its polarity and affinity for water, ethyl glycol plays an important part with regards to the bath resistivity and lowers it significantly. It therefore makes it possible to correct the resistivity and adjust it to the desired value.

Butylene glycol has the same influence as ethylene glycol on the resistivity, but due to the fact that it is also present in the resin during deposition, it helps to reduce the electrical resistance of the deposited film and therefore to increase its thickness, if this is necessary.

The cataphoresis bath is constituted by:

| | |
|---|---|
| Solution A | 23.1% |
| Solution B | 23.4% |
| $H_2O$ | 53.5% |
| i.e. E.S. = | 20% |
| M/O = | 0.68 |
| ρ= | 1050 Ω · cm |

| | |
|---|---|
| PH ≈ 6 | |

Deposition takes place as described in Example 1.

It makes it possible to regulate the thickness between 15 and 50 μm as a function of the voltages applied between 100 and 300 V at 20 mA/cm².

The heat treatment performed according to Example 1 at 1000° C. leads to a zirconia layer, whose thickness is perfectly controlled between 1.5 and 4 μm and whose pore spectrum is centered on the mean diameter of 0.015 μm, which is smaller than in Example 1, due to the fact that the zirconia powder used has a finer grain size.

EXAMPLE 3

Alumina microfiltration membrane on porous stainless support

In accordance with Example 2 the zirconia UHP at 40 m²/g is substituted by an alumina P 172 (marketed by Ceraltech) with a specific surface of 6 m²/g and constituted by elementary particles with a mean diameter of about 0.7 μm. A cataphoresis bath is prepared using the following proportions:

| | |
|---|---|
| Solution A | 9.43% |
| Solution B | 42.34% |
| $H_2O$ | 48.23% |

These characteristics are:

| | |
|---|---|
| E.S. = | 20% |
| M/O = | 0.2 |
| ρ = | 1000 Ω · cm |

The deposited thickness is 50 μm under a voltage of 300 V, an intensity of 20 mA/cm² and a time of 90s. After heat treatment at 1050° C. in accordance with Example 1, a 1.6 μm thick alumina coating is obtained, whose pore diameter is 0.3 μm.

EXAMPLE 4

Silicon carbide ultrafiltration membrane on a carbon-carbon composite support

The SiC powder used has a very high specific surface (80 m²/g) and is constituted by diameter 0.15 μm monodispersed spherical grains.

The following mixture is prepared:

| | |
|---|---|
| $H_2O$ | 70.0% |
| Résidrol SWE 5219 | 1.8% |
| Acetic acid | $1.8 \cdot 10^{-3}$ mole |
| SiC | 18.2% |
| Butyl glycol | 7.0% |
| Ethyl-2-hexanol | 3.0% |

Mixing takes place with the Turrax at 20,000 r.p.m. for 10 min, after which slow stirring of the mixture is maintained for 24 h prior to its use. The bath has the following characteristics:

| | |
|---|---|
| E.S. = | 20% |
| M/O = | 10 |
| ρ = | 500 Ω · cm |

A 50 μm thick deposit is made within a porous carbon-carbon composite tube at 100 V, an intensity of 20 mA/cm² and a time of 90s. The outside of the tube is previously electrically insulated by a thermoretractable sheath.

After heat treatment at 1100° C. under the same conditions as described in the previous examples, a silicon carbide (SiC) coating is obtained with a thickness of 9.5 μm and a pore diameter of 0.02 μm.

EXAMPLE 5

Figure 81:
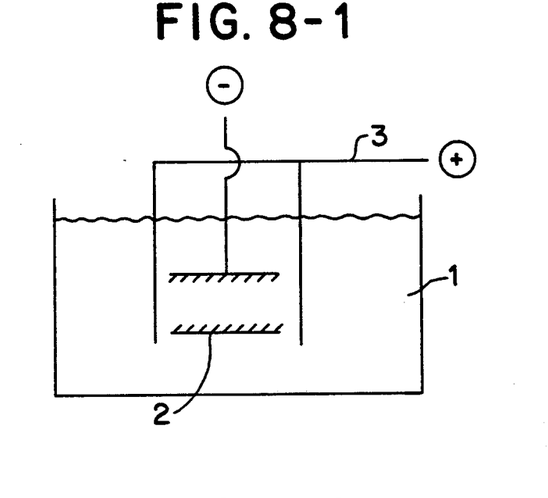

The influence of the geometry of a porous tube and that of the counterelectrode on the thickness of the membrane within the tube is investigated:

Test 1: stainless tube with l=10 cm and d=5 cm, plate-like counterelectrode (FIG. 8-1).

Figure 82:
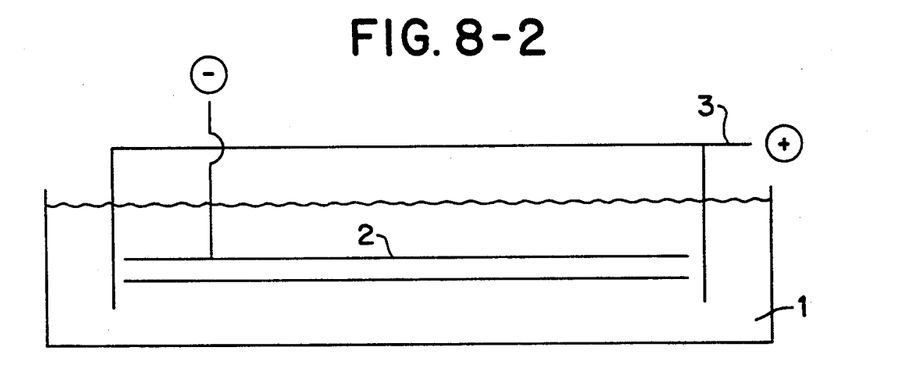

Test 2: stainless tube with l=50 cm and d=1 cm, plate-like counterelectrode (FIG. 8-2).

Figure 83:
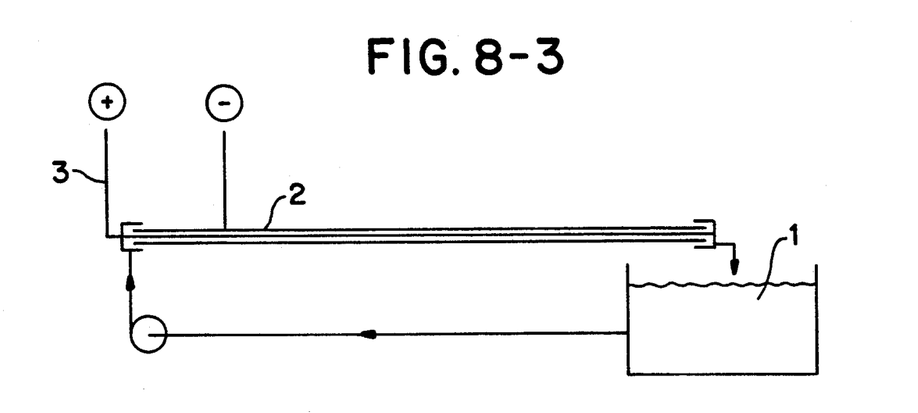

Test 3: stainless tube with l=50 cm and d=1 cm, counterelectrode centered within the tube (FIG. 8-3).

The other experimental parameters are as in Example 1 with an electrodeposition voltage of 200 V. The deposited membrane thickness was measured as a function of the distance separating the centre of the tube taken as the origin and the two ends. The results are given in FIGS. 9-1, 2 and 3, which correspond to Tests 1 to 3. The advantage of a centered counterelectrode is obvious.

DESCRIPTION OF THE DRAWINGS

FIG. 7-1 shows a mobile counterelectrode, like FIG. 7, but in the case of a non-rectilinear porous tube (2), with a centering member (9) keeping the conductive part (7) away from the tube wall and which is moved by pulling on the insulated electric cable (11).

FIGS. 8-1, 2 and 3 illustrate the geometry of the porous tubes and the counterelectrodes used in Example 5.

Curves 9-1, 2 and 3 show on the abscissa the distance in cm between the centre of the tube taken as the origin and the end thereof for each of the three tests of the example and on the ordinate the membrane thickness in $\mu$m.

We claim:

1. Process for the production of a microfiltration, ultrafiltration or reverse osmosis element, constituted by a semipermeable mineral membrane on a porous conductive support, comprising the steps of:
    a) dispersing one or more inert solid mineral products in a liquid medium comprising water or water mixed with at least partly hydrosoluble organic solvents and an electrodepositable, hydrosoluble coating resin to coat said mineral products with said resin;
    b) preparing an electrophoresis bath comprising the at least partly hydrosoluble organic solvents and said coating resin with said resin coated solid mineral product finely dispersed in the liquid medium;
    c) contacting the interior of a tubular porous conductive support with said electrophoresis bath with the porous conductive support as an electrode, said bath having a metal counterelectrode, over the entire surface of the porous conductive support in contact with the electrophoresis bath and depositing by electrophoresis on the porous support at least a layer of said electrodepositable resin-coated solid mineral products with only slight penetration and imbrication of the solid mineral products layer into the porous support; and
    d) heat treating said porous conductive support covered with the at least one layer of solid mineral product coated with an electro-coagulated resin to eliminate the water, the residual organic solvents and the organic materials, followed by the sintering of the mineral product layer until the desired pore fineness is obtained.

2. Process according to claim 1, wherein said inert solid mineral product is a mineral carbide, nitride or oxide in finely divided form, either alone or in mixed form, selected from the group consisting of zirconia ($ZrO_2$), alumina ($Al_2O_3$), titanium dioxide ($TiO_2$), silica ($SiO_2$), yttrium oxide ($Y_2O_3$), mullite ($3Al_2O_3$—$2SiO_2$), cordierite ($2Al_2O_3$—$2MgO$—$5SiO_2$), aluminum titanate ($Al_2TiO_5$), magnesium spinel (($Al_2MgO_4$), zircon ($ZrSiO_4$), silicon carbide (SiC) silicon nitride ($Si_3N_4$), SiAlON.

3. Process according to claim 1, wherein said inert solid mineral product is in the form of a peptized gel based on Al, Ti, Zr, Si or Y hydroxide or mixtures of said hydroxides with other metals able to lead to the formation of spinel.

4. Process according to claim 2, wherein said inert solid mineral product, either alone or mixed with other inert solid mineral products, is finely dispersed in a liquid medium constituted by 30 to 100% by weight water and 0 to 70% by weight of one or more at least partly hydrosoluble organic solvents, in the presence of an electrodepositable hydrosoluble resin, depositable by cataphoresis or by anaphoresis.

5. Process according to claim 4, wherein the dispersion of said mineral powder is continued, so as to obtain a mean grain size between 10 $\mu$m and 1 nm.

6. Process according to claim 5, wherein the composition of said electrophoresis bath is adjusted so as to have a M/O ratio between 0.1 and 25 and a sum M+O between 5 and 45% with M being equal to the weight percentage of mineral powder in the electrophoresis bath and O equal to the weight percentage of the coating resin (expressed in 100% resin) in the electrophoresis bath.

7. Process according to claim 6, wherein the M/O ratio is between 0.5 and 10 and wherein said sum M+O between 15 and 30%.

8. Process according to any one of the claims 1 to 7, wherein by electrophoresis is deposited on said porous conductive support having a random geometry, the said resin-coated, solid mineral product, which is electrodeposited under a voltage between 50 and 500 V, and with a current density between 5 and 50 mA/cm$^2$.

9. Process according to claim 8, wherein said resin-coated, solid mineral product coating has a dry extract exceeding 90%, following electrodeposition on the porous support.

10. Process according to any one of the claims 1 to 7, wherein said porous conductive support of random geometry has part of its surface out of contact with the electrophoresis bath and in which the other part has pores with a diameter between 0.1 and 50 $\mu$m.

11. Process according to any one of the claims 1 to 7, wherein said porous conductive support is a tube (2), which is longer than its diameter and in which typically the length to internal diameter ratio exceeds 4.

12. Process according to claim 11, wherein a counterelectrode (3) is centered in the interior of said tube and after contacting the electrophoresis bath (1) with all or part of the interior of tube (2), by electrophoresis is deposited on its inner surface a layer (10) of resin-coated solid mineral products, which electro-coagulate.

13. Process according to claim 12, wherein the counterelectrode (3) is a conductive rod over the entire length of the tube and which is centered with respect to the latter, by insulating endpieces (6) and wherein the electrophoresis bath (1) can be circulated within tube (2) during the electrodeposition stage.

14. Process according to claim 12, wherein the counterelectrode has a conductive part (7) and which is active as the counterelectrode and an insulated part (8), which is provided with at least one centering member (9) integral with the counterelectrode and advantageously positioned at the junction of the conductive part (7) and the insulated part (8) and wherein with the conductive part (7) immersed in the electrophoresis bath, it undergoes a relative displacement with respect to the tube (2) from end to the other of the latter, so that an electrodeposited coating is obtained over its entire inner surface.

15. Process according to claim 14, wherein the length of the conductive part (7) is less than that of the insulated part (8) and the length is preferably between 0.5 and 4 times the internal diameter of tube (2).

16. Process according to claim 14, wherein tube (2) may not be rectilinear, wherein the counterelectrode is constituted by a flexible insulated part (11) and a conductive part (7) integral with the centering member (9) and wherein electrodeposition takes place by displacing the counterelectrode by exerting a tensile stress on the flexible insulated part (8).

17. Process according to claim 14, wherein the relative displacement speed of tube (2) with respect to the conductive part (7) is dependent on an electrophoresis electric signal chosen from among the voltage, current density, current intensity or current quantity.

18. Process according to any one of the claims 1 to 7, wherein electrodeposition takes place simultaneously on several porous conductive supports.

19. Process according to any one of the claims 1 to 7, wherein deposition by electrophoresis is dependent on an electrophoresis electric signal chosen from among the voltage, current density, current intensity or current quantity and is in particular interrupted when the electric signal reaches a predetermined desired value.

20. Process according to any one of the claims 1 to 7, wherein the porous conductive support coated with said electro-coagulated, resin-coated, mineral powder layer is heat treated to eliminate organic materials and in order to at least partly sinter the mineral powder at a temperature between 500° and 2000° C.

21. Process according to claim 3 wherein said inert solid mineral product, either alone or mixed with other inert solid mineral products, is finely dispersed in a liquid medium constituted by 30 to 100% by weight water and 0 to 70% by weight of one or more at least partly hydrosoluble organic solvents, in the presence of an electrodepositable hydrosoluble resin, comprising a resin cathode depositable by cataphoresis or a resin anode depositable by anaphoresis.

22. Process according to claim 21 wherein the dispersion of said mineral powder is continued, so as to obtain a mean grain size between 10 μm and 1 nm.

23. Process according to claim 22 wherein the composition of said electrophoresis bath is optionally adjusted by the addition of water, at least partly hydrosoluble organic solvent and electrodepositable hydrosoluble resin to said solid mineral product finely dispersed in a liquid medium, so as to have a M/O ratio between 0.1 and 25 and a sum M+O between 5 and 45% with M being equal to the weight percentage of mineral powder in the electrophoresis bath and 0 equal to the weight percentage of the coating resin expressed in 100% resin in the electrophoresis bath.

24. Process for the production of a microfiltration, ultrafiltration or reverse osmosis element, constituted by a semipermeable mineral membrane on a porous conductive support, comprising the steps of:
a) preparing a dispersion by finely dispersing in an aqueous or hydroorganic medium insoluble solid mineral products in the presence of an electrodepositable coating resin to coat the mineral products with the resin;
b) utilizing the dispersion of a) as the electrophoretic medium of an electrophoresis bath;
c) depositing, by electrophoresis, on the interior of a tubular porous conductive support subjected to the electrophoresis bath, at least a coating of electrodeposited solid mineral products with only slight penetration and imbrication of the solid mineral products layer with the porous conductive support; and
d) heat treating the conductive support and its deposited coating to eliminate volatiles and sintering the coating of finely divided mineral solid products.

25. Microfiltration, ultrafiltration or reverse osmosis element, comprising a semipermeable mineral material on a porous conductive support, produced by a process comprising the steps of:
a) dispersing one or more inert solid mineral products in a liquid medium comprising water or water mixed with at least partly hydrosoluble organic solvents and an electrodepositable, hydrosoluble coating resin to coat said mineral products with said resin;
b) preparing an electrophoresis bath comprising the at least partly hydrosoluble organic solvents and said coating resin with said resin coated solid mineral product finely dispersed in the liquid medium;
c) contacting the interior of a tubular porous conductive support with said electrophoresis bath with the porous conductive support as an electrode, said bath having a metal counterelectrode, over the entire surface of the porous conductive support in contact with the electrophoresis bath and depositing by electrophoresis on the porous support at least a layer of said electrodepositable resin-coated solid mineral products with only slight penetration and imbrication of the solid mineral products layer into the porous support; and
d) heat treating said porous conductive support covered with the at least one layer of solid mineral product coated with an electro-coagulated resin to eliminate the water, the residual organic solvents and the organic materials, followed by the sintering of the mineral product layer until the desired pore fineness is obtained.

* * * * *